Patented May 14, 1946

2,400,092

UNITED STATES PATENT OFFICE 2,400,092

PROCESS FOR PREPARING COPPER-CONTAINING AZO DYESTUFFS

Norman L. Anderson, Buffalo, N. Y., assignor to Allied Chemical & Dye Corporation, New York, N. Y., a corporation of New York No Drawing. Application November 7, 1942, Serial No. 464,884

9 Claims. (Cl. 260—145)

This invention relates to an improved process for preparing copper-containing azo dyestuffs. More particularly the invention relates to an improved process for preparing copper complex derivatives of azo dye compounds by reacting coppering agents with azo dye compounds of a particular type; namely, those containing at least one radical having the following configuration:

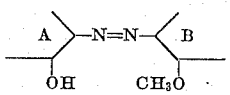

wherein A and B represent aromatic nuclei.

It was known heretofore to prepare copper complex derivatives of azo dye compounds by heating azo compounds of the aforesaid class with copper salts in aqueous solution. Owing to the fact, however, that the process involves elimination of a methyl group from the methoxy radical of the azo dye compound, the process as heretofore practiced was subject to a number of disadvantages. Thus, as is pointed out by Mendoza in U. S. P. 2,036,159, earlier processes were generally subject to the disadvantage that the reaction was incomplete, so that coppered dyestuffs of relatively inferior dyeing and fastness properties were obtained. To secure complete reaction in coppering the primary disazo compound obtained by coupling one mol of tetrazotized o-dianisidine with two mols of 1,8-amino-naphthol-2,4-disulfonic acid, Mendoza proposed boiling the disazo compound under reflux with an aqueous ammoniacal copper sulfate solution, until evolution of methylamine had ceased (about 20 hours).

I have found, in accordance with the present invention, that it is possible by means of my improved process to overcome the disadvantages of the said prior procedures, without having to resort to boiling under reflux. Thus, in carrying out the process according to my invention, the coppering treatment may be performed in an open vessel, resulting in considerable saving in cost and upkeep of equipment.

Further, I have found that, in the case of certain copper complex derivatives prepared by my improved process, they have superior properties as compared with copper complex derivatives produced from the same azo dye compound of the aforesaid type by boiling with an aqueous ammoniacal copper sulfate solution: the dyestuffs produced by my improved process yield considerably brighter shades on cotton, and they show a lesser tendency to stain organic derivatives of cellulose; whereas the dyestuffs obtained from the same azo dye compounds by boiling under reflux contain decomposition products (presumably as a result of the higher temperature conditions) which impair the brightness of shade of dyeings produced with the dyestuffs and stain organic derivatives of cellulose. Consequently, in the case of such copper complex derivatives, the coppered dyestuffs produced by my improved method can be advantageously employed for cross-dyeing union fabrics containing organic derivatives of cellulose, such as cellulose acetate fiber, together with cellulosic fiber, such as cotton or regenerated cellulose rayon.

In preparing copper-containing azo dyestuffs by my improved process, the heating of the azo dye compound of the aforesaid type with an aqueous ammoniacal solution of a copper salt, preferably of a cupric salt, is carried out at a temperature between 85° and 100° C., and preferably at a temperature of 90° to 95° C., in the presence of metallic copper.

Metallic copper may be added to the reaction mixture in the form of dust, filings, thin sheets, or the like, or it is sufficient merely to employ a reaction vessel of metallic copper. While I have not been able to determine conclusively the reason for the beneficial effect of the metallic copper, it seems probable that the metal acts as a catalyst in the reaction, so as to facilitate the formation of the copper complex derivative of the azo dye compound.

Ammoniacal copper sulfate is generally employed as the coppering agent; although other water-soluble copper salts, especially cupric salts, which are adapted to form a cupramine complex with ammonia may be employed. The ammonia may be conveniently added in the form of an aqueous solution, e. g., 27 to 28% aqua ammonia. The proportions of the reagents are preferably such that at least one atomic equivalent of copper is present for each azo group equivalent included by the aforesaid configuration in the azo compound to be coppered. At least 4 mols of ammonia are preferably employed for each atomic equivalent of bivalent copper in the form of its salts, and generally a moderate excess of ammonia (e. g., 15 to 20% of the theoretical amount required) is maintained in the mixture during the reaction. For this purpose small amounts of ammonia may be added to the mixture during the reaction in order to replace any ammonia which escapes. The reaction mixture generally comprises sufficient water to yield a concentration of about one-tenth mol in terms of parts by weight of azo dye compound for each 1000 parts by weight of water.

The azo dye compound is suspended or dissolved in the water together with the copper salt and the ammonia. Copper is also added, unless the reaction is carried out in a vessel having a copper surface in contact with the reaction mixture. The mixture is heated at temperatures between 85° and 100° C. and preferably at a temperature of 90° to 95° C. The temperature is maintained until the reaction is complete. Completion of the reaction generally requires from about 24 to about 48 hours. Temperatures of 100° C. or more are avoided since ammonia is evolved so rapidly at such temperatures as to render the process uneconomical, and in some cases the copper complex thereby formed becomes contaminated with undesirable impurities. At temperatures substantially below 85° C., the reaction is too slow to be of commercial value.

The invention will be more readily understood from the following examples in which parts are by weight and temperatures are in degrees centigrade.

Example 1.—60 parts of the disazo dye compound obtained by coupling one mol of tetrazotized o-dianisidine with two mols of sodium 1-benzoylamino-8-naphthol-2,4-disulfonate in alkaline solution are agitated with 1000 parts of water. The suspension is heated to 90° to 95° and 5 parts of copper filings are added. An aqueous solution of 25 parts of copper sulfate ($CuSO_4.5H_2O$) and 30 parts of aqua ammonia (27% $NH_3$) in 100 parts of water is added and the reaction mixture is agitated for about 48 hours in an open vessel while maintaining the temperature at 90° to 95°. Small amounts of ammonia are added from time to time during the reaction to replace the ammonia which escapes. The reaction mixture is filtered to separate the copper filings, and 200 parts of sodium chloride are added to the filtrate. Upon cooling to about 20° the dyestuff is precipitated, filtered from the mother-liquor, and recovered in the form of a filter cake. Upon drying the latter, a copper-containing dyestuff is obtained having the following probable formula:

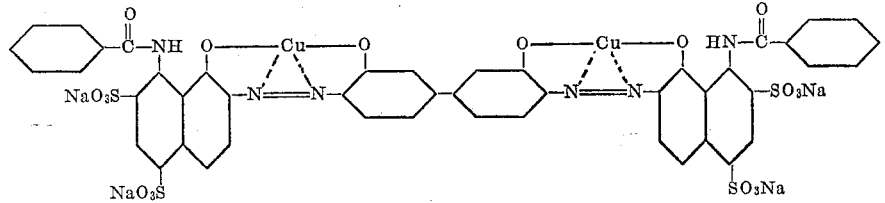

Example 2.—Three equal portions of the disazo compound employed in Example 1 (obtained by coupling one mol of tetrazotized o-dianisidine with two mols of sodium 1-benzoylamino-8-naphthol-2,4-disulfonate in alkaline solution) are converted into the corresponding copper complex derivative by heating with equal amounts of aqueous ammoniacal copper sulfate of the same composition in the following manner:

*Part A*

The disazo compound is heated with the aqueous ammoniacal copper sulfate at 90° to 100° for 24 hours in an open glass vessel.

*Part B*

The disazo compound is heated with the aqueous ammoniacal copper sulfate at the boiling temperature of the mass for 24 hours in a glass vessel equipped with a reflux condenser.

*Part C*

The disazo compound is heated with aqueous ammoniacal copper sulfate at 90° to 100° for 24 hours in an open copper vessel.

The copper complex derivatives obtained from parts A, B and C, when employed for dyeing cotton, yield blue shades which compare as follows:

The copper-containing dyestuff of Part C produces a shade much greener and brighter than the dyestuff of Part A, and considerably greener and brighter than the dyestuff of Part B. The dyestuff of Part B produces shades slightly greener than the dyestuff of Part A, but considerably redder than the dyestuff of Part C, while the dyeing produced with the dyestuff of Part A is much redder than that from the dyestuff of Part C. (Degrees of difference, in order of increasing difference, are: "appreciably," "considerably," "much." Samples of cotton dyed with the three dyestuffs, when tested for light fastness by exposure for 48 hours in a Fade-Ometer, yield results indicating the dyestuffs of Parts B and C to be substantially equally fast, while the dyestuff of Part A is considerably inferior to those of Parts B and C.

These results clearly show the superiority of dyestuffs produced by my improved process as compared with similar dyestuffs produced by the reflux method, or by heating at less than reflux temperature in the absence of metallic copper.

Example 3.—A disazo dye compound is produced by tetrazotizing o-dianisidine and coupling with R salt in the following manner: 19.6 parts of o-dianisidine are mixed with 320 parts of water containing 16.1 parts of 22° Bé. hydrochloric acid. The mixture is heated to 80° and then cooled by addition of 300 parts of ice. 26 parts of 22° Bé. hydrochloric acid and 11.4 parts of sodium nitrite are then added, and the mixture is agitated for two hours. The solution of tetrazo o-dianisidine thus formed is added rapidly to an ice-cold aqueous solution made up of 49.2 parts of monosodium 2-naphthol-3,6-disulfonate, 64 parts of sodium carbonate, 400 parts of ice and 480 parts of water. The temperature is maintained at 0° to 5° by further addition of ice, and the coupling reaction is permitted to continue for about 16 hours. At the end of this period, the mixture is heated to 85° and sodium chloride is added in an amount equivalent to 20% of the weight of a volume of water equal to that of the reaction mixture. The mixture is then cooled to about 20°, and the resulting disazo compound thereby precipitated is recovered by filtration in the form of a filter cake. The latter is divided into two equal portions which are treated as follows:

*Part A*

One portion is mixed with 800 parts of water, and to the mixture is added a solution made up of 24 parts of copper sulfate ($CuSO_4.5H_2O$), 28 parts of aqua ammonia (27%), and 80 parts of water. The mixture is heated to boiling temperature and boiled under reflux for 24 hours. The mixture is then salted with sodium chloride, and cooled to precipitate the copper complex of the azo dyestuff. The precipitated product is separated by filtration, and the filter cake is dried.

Part B

The other portion of the filter cake of the azo compound is suspended in 800 parts of water, and to the mixture is added a solution made up of 24 parts of copper sulfate ($CuSO_4.5H_2O$), 28 parts of aqua ammonia (27%), and 80 parts of water, together with 5 parts of copper filings. The mixture is then heated in an open vessel for 24 hours at 90° to 95°. After filtering out the copper filings, the copper complex of the dyestuff is separated by salting out, and recovered in the manner above described.

The copper-containing dyestuffs thus obtained dye cotton in substantially the same reddish-blue shades. Their probable formula is as follows:

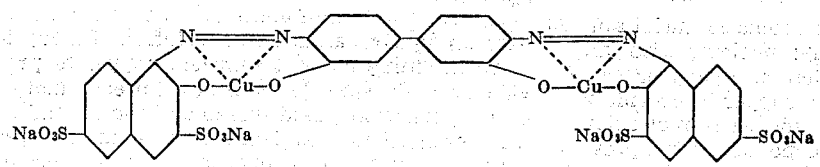

The improved process of this invention may be similarly applied with advantage to other azo dye compounds containing at least one radical having the configuration

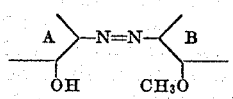

as defined above.

For instance, instead of the disazo dye compounds of the foregoing examples, there may be substituted an equivalent quantity of a disazo compound having the following probable formula:

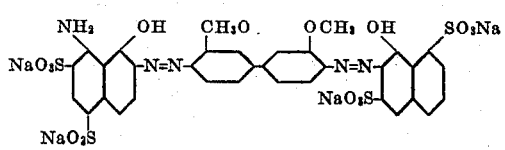

which is obtainable by coupling one mol of tetrazotized o-dianisidine, on the one hand, with one mol of 1-amino-8-naphthol-2,4-disulfonic acid in alkaline solution and, on the other hand, with one mol of 1-naphthol-3,8-disulfonic acid. A copper complex derivative is thus obtained, yielding blue colorations on cellulosic fiber, and having the probable formula:

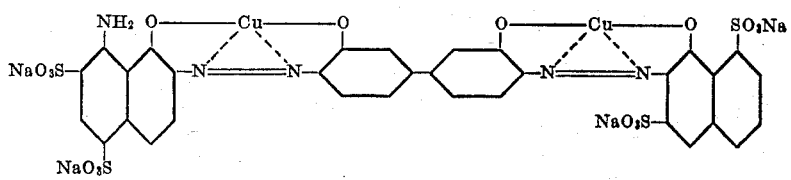

Variations and modifications may be made in the details of the foregoing examples without departing from the invention. Accordingly, the foregoing details are not to be interpreted in a limiting sense.

Certain of the copper-containing dyestuffs disclosed above are claimed in my application Serial No. 464,885, filed of even date herewith, and my application Serial No. 486,702, filed May 12, 1943.

I claim:

1. In a process for preparing copper complex derivatives of azo dye compounds by reacting an aqueous ammoniacal solution of a copper salt with an azo dye compound containing at least one radical having the following configuration:

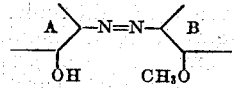

wherein A and B represent aromatic nuclei, the improvement which comprises carrying out said reaction in an aqueous ammoniacal solution of a copper salt, in the presence of metallic copper, at a temperature between 85° and 100° C.

2. In a process for preparing copper complex derivatives of azo dye compounds by reacting an aqueous ammoniacal solution of a copper salt with an azo dye compound containing at least one radical having the following configuration:

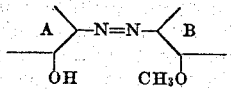

wherein A and B represent aromatic nuclei, the improvement which comprises carrying out said reaction in an aqueous ammoniacal solution of a cupric salt, in the presence of metallic copper, at a temperature between 85° and 100° C.

3. In a process for preparing copper complex derivatives of azo dye compounds by reacting a coppering agent with an azo dye compound containing at least one radical having the following configuration:

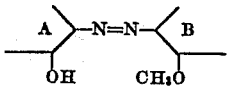

wherein A and B represent aromatic nuclei, the improvement which comprises heating said azo dye compound in an aqueous ammoniacal solution of a cupric salt containing at least sufficient copper to provide one atomic equivalent thereof for each equivalent of said radical, and at least 4 molecular equivalents of ammonia per atomic equivalent of copper at a temperature between 85° and 100° C. in the presence of metallic copper.

4. In a process for preparing copper complex derivatives of azo dye compounds by reacting a coppering agent with an azo dye compound containing at least one radical having the following configuration:

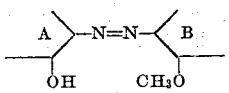

wherein A and B represent aromatic nuclei, the improvement which comprises heating said azo dye compound in an aqueous ammoniacal solution of a cupric salt containing at least sufficient copper to provide one atomic equivalent thereof for each equivalent of said radical, and at least 4 molecular equivalents of ammonia per atomic equivalent of copper, at a temperature of 90° to 95° C. in the presence of metallic copper until the coppering reaction is substantially complete.

5. A process of preparing a copper-containing azo dyestuff, which comprises heating a disazo compound containing a radical having the following configuration:

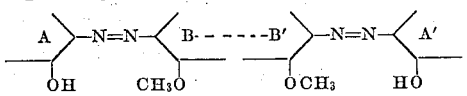

wherein A and A' represent aromatic nuclei and B—B' represents a biphenyl nucleus, with an aqueous ammoniacal solution of a copper salt containing at least sufficient copper to provide 2 atomic equivalents thereof for each molecular equivalent of said disazo compound, in the presence of metallic copper, at a temperature between 85° and 100° C.

6. A process for preparing a copper-containing azo dyestuff for dyeing cellulosic materials, which comprises heating a symmetrical disazo compound obtainable by coupling one mol of tetrazotized o-dianisidine with two mols of a 1-benzoylamino-8-naphthol-2,4-disulfonate, with an aqueous ammoniacal solution of a cupric salt containing at least sufficient copper to provide 2 atomic equivalents thereof for each molecular equivalent of said disazo compound, and at least 4 molecular equivalents of ammonia per atomic equivalent of copper, at a temperature of 90° to 95° C. in the presence of metallic copper, for a period of about 24 to about 48 hours.

7. A process for preparing a copper-containing azo dyestuff for dyeing cellulosic materials, which comprises heating a symmetrical disazo compound obtainable by coupling one mol of tetrazotized o-dianisidine with two mols of a 2-naphthol-3,6-disulfonate, with an aqueous ammoniacal solution of a cupric salt containing at least sufficient copper to provide 2 atomic equivalents thereof for each molecular equivalent of said disazo compound, and at least 4 molecular equivalents of ammonia per atomic equivalent of copper, at a temperature of 90° to 95° C. in the presence of metallic copper, for a period of about 24 to about 48 hours.

8. A process for preparing a copper-containing azo dyestuff for dyeing cellulosic materials, which comprises heating a disazo compound obtainable by coupling one mol of tetrazotized o-dianisidine with one mol of a 1-amino-8-naphthol-2,4-disulfonate on the one hand, and with one mol of a 1-naphthol-3,8-disulfonate on the other hand, with an aqueous ammoniacal solution of a cupric salt containing at least sufficient copper to provide 2 atomic equivalents thereof for each molecular equivalent of said disazo compound, and at least 4 molecular equivalents of ammonia per atomic equivalent of copper, at a temperature of 90° to 95° C. in the presence of metallic copper, for a period of about 24 to about 48 hours.

9. A copper-containing azo dyestuff obtained by heating a disazo compound obtainable by coupling one mol of tetrazotized o-dianisidine with two mols of a 1-benzoylamino-8-naphthol-2,4-disulfonate, with an ammoniacal solution of a cupric salt at a temperature between 85° and 100° C. in the presence of metallic copper, and salting out the resulting dyestuff.

NORMAN L. ANDERSON.